(12) United States Patent
De Jonge

(10) Patent No.: US 11,947,658 B2
(45) Date of Patent: Apr. 2, 2024

(54) PASSWORD GENERATION DEVICE AND PASSWORD VERIFICATION DEVICE

(71) Applicant: MINDYOURPASS HOLDING B.V., Eindhoven (NL)

(72) Inventor: Merijn De Jonge, Eindhoven (NL)

(73) Assignee: MINDYOURPASS HOLDING B.V., Eindhoven (NL)

( * ) Notice: Subject to any disclaimer, the term of this patent is extended or adjusted under 35 U.S.C. 154(b) by 350 days.

(21) Appl. No.: 16/312,790

(22) PCT Filed: Jun. 21, 2017

(86) PCT No.: PCT/EP2017/065199
§ 371 (c)(1),
(2) Date: Dec. 21, 2018

(87) PCT Pub. No.: WO2017/220636
PCT Pub. Date: Dec. 28, 2017

(65) Prior Publication Data
US 2019/0220590 A1    Jul. 18, 2019

(30) Foreign Application Priority Data
Jun. 23, 2016 (NL) .................................. 2017032

(51) Int. Cl.
*G06F 21/46* (2013.01)
*H04L 9/06* (2006.01)
(Continued)

(52) U.S. Cl.
CPC ............ *G06F 21/46* (2013.01); *H04L 9/0643* (2013.01); *H04L 9/0866* (2013.01);
(Continued)

(58) Field of Classification Search
CPC ..... G06F 21/46; H04L 9/0872; H04L 9/3236; H04L 9/0866; H04L 9/3226; H04L 9/0643; H04L 9/3231
See application file for complete search history.

(56) References Cited

U.S. PATENT DOCUMENTS 5,774,551 A * 6/1998 Wu .................... G06F 21/31
713/155
6,006,333 A  12/1999 Nielsen
(Continued)

FOREIGN PATENT DOCUMENTS

WO    WO01/52025 A2    7/2001

OTHER PUBLICATIONS

International Search Report and Written Opinion for PCT Patent App. No. PCT/EP2017/065199 (dated Aug. 11, 2017).

*Primary Examiner* — Oleg Korsak
(74) *Attorney, Agent, or Firm* — Whitestone Law, PLLC

(57) ABSTRACT

Some embodiments are directed to a password generation device that includes an input unit arranged to receive, from a user device, a computer address for accessing a computer resource, a user identifier indicating a user of the user device, a user password, and a password unit arranged to determine a first combined identifier from a base address system-identifier, a user system-identifier, and the user password. Moreover, the password generation device may be configured for password verification and/or validation.

20 Claims, 6 Drawing Sheets

(51) Int. Cl.
*H04L 9/08* (2006.01)
*H04L 9/32* (2006.01)

(52) U.S. Cl.
CPC .......... *H04L 9/0872* (2013.01); *H04L 9/3226* (2013.01); *H04L 9/3236* (2013.01); *H04L 9/3231* (2013.01)

(56) References Cited

U.S. PATENT DOCUMENTS

| | | | | |
|---|---|---|---|---|
| 6,996,718 B1* | 2/2006 | Henry | ...................... | G06F 21/41 713/182 |
| 7,809,130 B1* | 10/2010 | Kalyadin | .............. | H04L 9/0894 713/184 |
| 8,443,202 B2* | 5/2013 | White | .................... | H04L 9/3228 380/258 |
| 9,225,704 B1* | 12/2015 | Johansson | ............... | H04L 63/08 |
| 9,288,047 B2* | 3/2016 | Brouwer | .................... | H04L 9/14 |
| 9,824,208 B2* | 11/2017 | Cavanagh | ............... | H04L 63/06 |
| 10,003,595 B2* | 6/2018 | Woo | ......................... | H04L 63/08 |
| 10,423,776 B1* | 9/2019 | Li | .......................... | H04L 9/3236 |
| 10,462,135 B2* | 10/2019 | Varadarajan | ........ | H04L 63/0428 |
| 10,475,018 B1* | 11/2019 | Hitchcock | .............. | G06Q 20/40 |
| 2002/0083012 A1* | 6/2002 | Bush | ........................ | H04L 63/10 705/76 |
| 2003/0005299 A1* | 1/2003 | Xia | ........................... | G06F 21/31 713/171 |
| 2004/0025026 A1* | 2/2004 | Karp | ........................ | G06F 21/41 713/183 |
| 2004/0117662 A1* | 6/2004 | Ong | ......................... | G06F 21/41 726/5 |
| 2004/0158746 A1* | 8/2004 | Hu | ............................ | G06F 21/41 726/8 |
| 2004/0187018 A1* | 9/2004 | Owen | ...................... | H04L 9/321 713/184 |
| 2009/0150991 A1* | 6/2009 | Hoey | .................... | H04L 63/0807 726/18 |
| 2009/0183008 A1* | 7/2009 | Jobmann | ................... | G06F 21/34 235/382 |
| 2010/0287606 A1* | 11/2010 | Machani | .................. | G06F 21/34 709/206 |
| 2011/0119747 A1* | 5/2011 | Lambiase | ............. | H04L 9/3234 726/8 |
| 2012/0297190 A1* | 11/2012 | Shen | .................... | H04L 63/0815 713/168 |
| 2013/0024918 A1* | 1/2013 | Cramer | .................. | H04L 9/3231 726/6 |
| 2013/0086655 A1* | 4/2013 | Karp | ....................... | G06F 21/45 726/6 |
| 2014/0282949 A1* | 9/2014 | Nath | ...................... | G06F 16/955 726/6 |
| 2015/0006907 A1* | 1/2015 | Brouwer | ............... | H04L 9/0838 713/189 |
| 2015/0074407 A1* | 3/2015 | Palmeri | ............... | H04L 63/0823 713/171 |
| 2015/0286816 A1* | 10/2015 | Adler | ...................... | G06F 21/45 726/6 |
| 2015/0365402 A1* | 12/2015 | Woo | ...................... | H04L 63/067 726/6 |
| 2016/0006720 A1* | 1/2016 | Spaulding | ........... | H04L 63/0838 726/8 |
| 2016/0105420 A1* | 4/2016 | Engan | ................... | H04L 9/3228 455/411 |
| 2016/0366121 A1* | 12/2016 | Rykowski | ........... | H04L 63/0815 |
| 2017/0011213 A1* | 1/2017 | Cavanagh | ............. | H04L 67/02 |
| 2017/0011214 A1* | 1/2017 | Cavanagh | ............. | H04L 63/06 |
| 2017/0054699 A1* | 2/2017 | Fukuda | ................ | H04L 9/3226 |
| 2017/0118215 A1* | 4/2017 | Varadarajan | ............ | H04L 63/10 |
| 2017/0308695 A1* | 10/2017 | Adams | .................... | H04L 63/06 |
| 2017/0346821 A1* | 11/2017 | Yedidi | ................ | H04L 63/0876 |

* cited by examiner

PASSWORD GENERATION DEVICE AND PASSWORD VERIFICATION DEVICE

CROSS REFERENCE TO RELATED APPLICATION(S)

This application is a National Phase Filing under 35 C.F.R. § 371 of and claims priority to PCT Patent Application No. PCT/EP2017/065199, filed on Jun. 21, 2017, which claims the priority benefit under 35 U.S.C. § 119 of Netherlands Patent Application No. 2017032, filed on Jun. 23, 2016, the contents of each of which are hereby incorporated in their entireties by reference.

BACKGROUND

The presently disclosed subject matter relates to a password generation device, password generation method and a computer program.

Computer users have to remember a lot of passwords to gain access to various computer resources. Even information or news websites, increasingly promote that users register for an 'account' with which to gain access to services such as personalized news, etc. At the same time, many applications that were previously running locally are being replaced by online versions, e.g., word processing, file storage, and the like.

SUMMARY

To deal with the proliferation of passwords, users have adopted various coping strategies. For example, some users simply use the same password for all or most their online accounts. This method has the advantage of placing only a small burden on the memory of the user, and probably does not require him to locally store his password. On the other hand, this method has the disadvantage that, once his password is compromised, all or most his online accounts are in danger. Compromising the password, does not even have to be caused by an error of the user, but may be due to, e.g., a hacked website on which he has an account.

Another approach is to use a password manager. A password manager is a computer application that helps a user to manage his set of passwords. Typically, it stores passwords, e.g., locally or in the cloud, and encrypts them with a master password. The application signs in to online accounts and synchronizes passwords across multiple browsers and devices.

In practice, there are still various disadvantages with such password managers. For example, a compromised website still means that many passwords are compromised. Although, a password manager makes it easier to use different passwords, there is no guarantee that a password is locally unique, let alone that passwords are globally unique. Furthermore, a hack of the password manager implies that all or most local passwords are compromised. There is no way to quickly invalidate all or most these passwords.

Passwords not only cause problems for users but also for computer resources, e.g. the web sites, themselves. In particular, a web site cannot judge the quality of a password. For example, a web site cannot determine if a password has been used for a different web site as well.

Some embodiments are directed to a password generation device is provided, addressing some of the concerns mentioned herein. The password generation device includes an input unit arranged to receive from a user device a computer address for accessing a computer resource, a user identifier indicating a user of the user device, and a user password, a computer address unit arranged to map the computer address to a base address, so that multiple computer addresses are mapped to the same base address, an identifier manager arranged to determine if the base address is registered with the identifier manager, and if not: assign a unique base address system-identifier to the base address, and store the base address together with the base address system-identifier, if so: obtain the base address system-identifier, determine if the user identifier is registered with the identifier manager, and if not: assign a unique user system-identifier to the user identifier, and store the user identifier together with the user system-identifier, if so: obtain the user system-identifier, and a password unit arranged to determine a first combined identifier from the base address system-identifier, the user system-identifier, and the user password.

The password generated by the password generation device may be the first combined identifier or derived therefrom, e.g., through the computation of a second combined identifier. Passwords generated by the password generation device have a number of advantages as indicated herein. For example, by changing the system-identifiers whole classes of passwords may be invalidated.

Advantageously, the password generation system can be extended by determining a second combined identifier, which also allows individual invalidation. If needed, a password constraint imposed by a website, may be satisfied by deriving a final password from the second combined identifier and/or the first combined identifier that satisfies the password constraint.

Furthermore, by having a central system for generating passwords global security improvements may be obtained. For example, in an embodiment, the password generation device includes a verification unit arranged to determine if a password received by a website was generated by the password generation system, and in particular if it was generated for that website.

The password generation is an electronic device, for example, a computer such as a server, or the like.

A method according to the presently disclosed subject matter may be implemented on a computer as a computer implemented method, or in dedicated hardware, or in a combination of both. Executable code for a method according to the presently disclosed subject matter may be stored on a computer program product. Examples of computer program products include memory devices, optical storage devices, integrated circuits, servers, online software, etc. In one embodiment, the computer program product includes non-transitory program code stored on a computer readable medium for performing a method according to the presently disclosed subject matter when said program product is executed on a computer.

In an embodiment of the presently disclosed subject matter, the computer program includes computer program code adapted to perform all or most the steps of a method according to the presently disclosed subject matter when the computer program is run on a computer. In some embodiments, the computer program is embodied on a computer readable medium.

BRIEF DESCRIPTION OF THE DRAWINGS

Further details, aspects, and embodiments of the presently disclosed subject matter will be described, by way of example, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a password generation device, FIG. 1b schematically shows an example of an embodiment of a password unit, FIG. 2 schematically shows an example of deriving a final password, FIG. 3 schematically shows an example of an embodiment of a password generation device, FIG. 4 schematically shows an example of an embodiment of a password generation method, FIG. 5a schematically shows a computer readable medium having a writable part including a computer program according to an embodiment, FIG. 5b schematically shows a representation of a processor system according to an embodiment.

DETAILED DESCRIPTION OF EXEMPLARY EMBODIMENTS

Figure 1A:
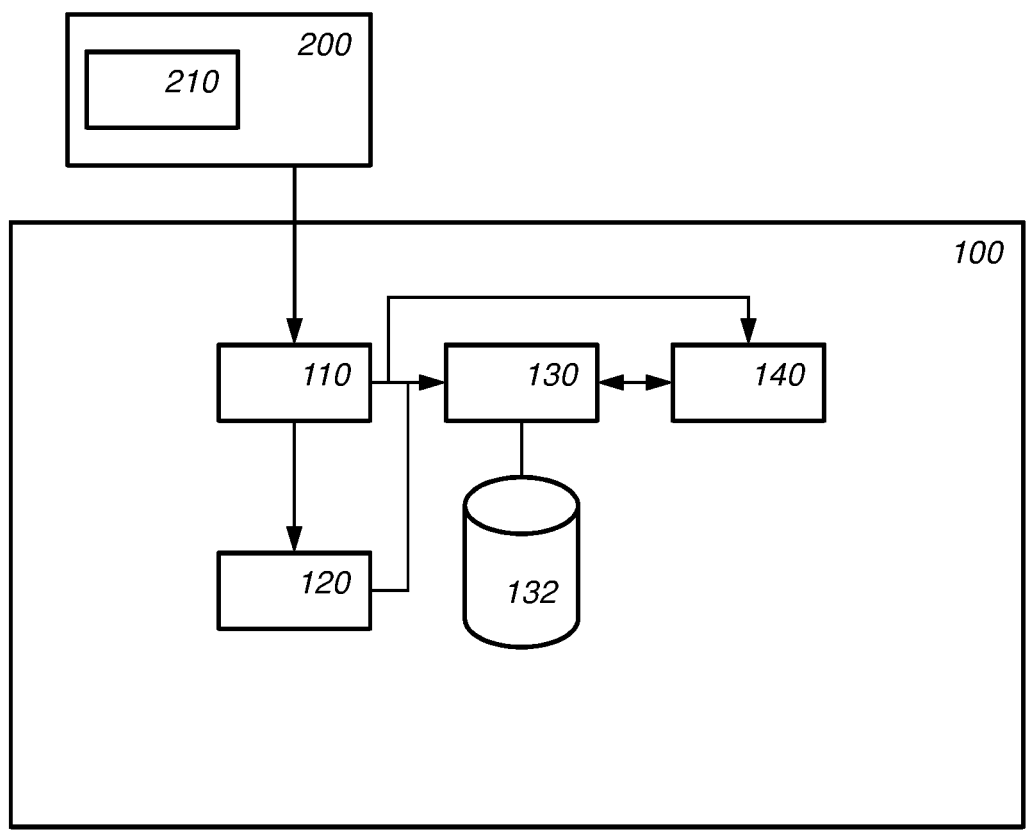

While this presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit the presently disclosed subject matter to the specific embodiments shown and described.

In the following, for the sake of understanding, elements of embodiments are described in operation. However, it will be apparent that the respective elements are arranged to perform the functions being described as performed by them.

FIG. 1a schematically shows an example of an embodiment of a password generation device 100. The description below makes further reference to FIG. 2 which illustrates a possible relationship between some of the data items employed in an embodiment of a password generation device.

Password generation device 100 may be used with a user device 200. Password generation device 100 is arranged to generate a password that may be used to access a computer resource. Password generation device 100 offers many advantageous in this respect. For example, password generation device 100 generates stronger passwords than unassisted users typically do, thus reducing the probability that a user's password is guessed by an attacker. Moreover, all or most passwords for a particular user or for a particular website may be quickly disabled. Thus, if a user or website is compromised, any passwords that the attacker may have obtained may be easily disabled. Interestingly, this functionality may be implemented without storing the passwords themselves.

Password generation device 100 includes an input unit 110 arranged to receive a computer address 310 from user device 200, a user identifier 320 indicating a user of the user device, and a user password 330. Generally, the user password is a hash of an original user password to avoid transmission of the original user password. The latter is however not necessary, for example, if the transmission between the user device and the password generation device is secure.

For example, input unit 110 may receive the information over a computer network, e.g., the Internet, a LAN, WAN, etc. The computer network may be wholly or partially wired or wireless, etc.

In an embodiment, user device 200 is a computer running a web browser 210. Computer address 310 may be a URL (Uniform Resource Locator), e.g., a first url URL1. Computer address 310 may be used to access a login-page of a web-page. For example, URL1 may be: https://myaccount.nytimes.com/auth/login.

In an embodiment, web browser 210 is arranged to obtain the user password, user identifier, and computer address of the web page, e.g., a web page on which a password field is detected. Web browser 210 is arranged to send user password 330, user identifier 320, and computer address 310 to password generation device 100, e.g., over the computer network. For example, the above functionality may be implemented in the web browser in the form of a so-called plug-in. Web browser 210 may use any additional desired communication methods or systems, e.g., the https protocol for further protection of the communication between web browser 210 and password generation device 100.

In an embodiment, it is avoided that an original user password obtained and/or stored at user device 200, e.g., by web browser 210 is sent in plain to password generation device 100. For example, web browser 210 may receive the user password directly from the user, e.g., by typing the password, but instead web browser 210 may receive an original user password, and apply a hash function to the original password to obtain the user password. Hash functions may be one-way hash functions, in particular, cryptographic hash functions. Examples of cryptographic hash functions include the suite SHA-2. A hash output may be truncated if desired, e.g., to 64 bits or more, etc. Browser 210 is arranged to send the user password, computer address and user identifier to password generation device 100, but not the original password.

In an embodiment, user device 200, e.g., web browser 210, receives a final password from the password generation device. User device 200 may then use the final password to access the computer resource. For example, web browser 210 may enter the final password in the password field. User device 200, e.g., browser 210 then sends the password to the computer resource to gain access. Communication of passwords may be encrypted, e.g., using https. Below an embodiment is given in which the password does not pass through user device 200, but is directly communicated between password generation device 100, and the computer resource, e.g., using tickets.

It is not necessary that password generation device 100 is an external computer connected with user device 200 through a computer network. For example, password generation device 100 may be included in user device 200. The computer resource may be a resource accessible by user device 200 over the computer network, for example, a web service, e.g., a banking service, an online editor, a news service, a social networking site, and the like. The computer resource may also be a resource accessible locally on user device 200; for example, a computer application protected by a password. To explain the presently disclosed subject matter, we will assume below that password generation device 100 is a device external to user device 200, with the proviso that this is not necessary.

In an embodiment, user device 200 has access to multiple computer resources, e.g., multiple websites, or multiple local applications, or a combination thereof. A different resource with a different computer address, e.g., a different URL, typically causes password generation device 100 to compute a different password.

In an embodiment, the user identifier may identify the user and/or user device 200 to password generation device

100. For example, the user identifier may be unique for all or most users of password generation device 100. Alternatively, the user identifier may be a user identifier used to identify the user to the computer resource. In this case, password generation device 100 may be arranged to ensure that the combination of base address and user identifier is unique, e.g., unique for password generation device 100.

Below we will assume that the same user will use the same user identifier, or a limited number of user identifiers, to access a larger number of computer resources. Password generation device 100 may be arranged to identify the user based on the user identifier.

In an embodiment, password generation device 100 stores a list of user identifiers 320 of registered users. Password generation device 100 may also store a list of device identifiers of the devices of registered users. For example, lists may be stored, e.g., in a computer file, database, in the cloud etc. Input unit 110 may be arranged to receive a user device identifier, in addition to the user identifier. User device 200 may be arranged to refuse to generate a password if the received user device identifier is not registered or is blocked. Likewise, user device 200 may be arranged to refuse to generate a password if the received user identifier is not registered or is blocked. For example, user device 200 may store a white list, with accepted user and/or device identifiers. For example, user device 200 may store a black list, with blocked user and/or device identifiers. A combination of white and black lists is also possible. For example, a MAC address, or IP address of user device 200 may be used as user device identifier.

In an embodiment, the user password includes attributes associated with the user or user device, e.g., a biometric identifier obtained from a biometric sensor. For example, user device 200 may include a biometric sensor arranged to produce a reproducible identifier. Biometric sensors include fingerprint sensors, and facial biometric sensors, e.g., arranged to map a fingerprint or face to an identifier. Attributes associated with a user device may, e.g., include a device profile, device serial numbers, and the like. Attributes associated with a user may include a password, biometric identification, two-factor authentication, and the like.

Password generation device 100 further includes a computer address unit 120 arranged to map the computer address to a base address 312, so that multiple computer addresses are mapped to the same base address. It may happen that the same computer resource is accessible under different computer addresses. For example, if a first computer address (URL1) is https://myaccount.nytimes.com/auth/login, a second computer address (URL2) is https://nytimes.com/auth/login, a third computer address (URL3) is https://nytimes.com/login, then all or most three computer addresses give access to the same computer resource, e.g., a website; in this case a login page to access a news website. Although the two computer addresses are different, they accept the same login credentials. Computer address unit 120 maps different computer addresses to a common base address so that the same password will be generated for both computer addresses. In an embodiment, computer address unit 120 is arranged to select one or more elements from the computer address as the base address. For example, computer address unit 120 may select the domain name of a URL as the base address. In the example above, computer address unit 120 may be arranged to take nytimes.com as the base address.

On the other hand, in an embodiment, computer address unit 120 may be arranged to remove one or more elements from the computer address to obtain the base address. For example, computer base address unit 120 may remove selected part of the computer address to obtain the base address. For example, computer address unit may remove a protocol indicator (e.g., https in the above example), and/or remove common parts, such as www, etc. For example, with the latter method one may arrange that, URL1 and URL2 still point to the same base address, e.g., nytimes.com/auth/login, but URL3 does not.

Password generation device 100 further includes an identifier manager 130. Identifier manager 130 is arranged to map various data items to system identifiers. For example, a data item can be registered with identifier manager 130 to obtain a system identifier. If the data item has not been registered before a new system identifier is assigned. If the data item has been registered before, a new system identifier is retrieved. System identifiers may be unique, e.g., unique within the data items of a particular type registered within the system, or unique within all or most identifiers assigned by identifier manager 130. This may be achieved by using a serial number, a timestamp, possibly modified by a collision resistant function, e.g., encrypted or hashed, etc. A stricter requirement may be that system-identifiers are globally unique. The latter may be achieved by assigning a random number of sufficient length; for example, a random number of 80 bits, 128 bits, etc. A sufficient length may be calculated by estimating the maximum number of system identifiers used worldwide within the lifetime of the system. It is expected that random system identifiers will be sufficient to be globally unique. For example, system identifiers may be so-called 'globally unique identifiers', also known as GUIDs. A random number generator may be included in password generation system 100.

In an embodiment, identifier manager 130 is used to obtain a system identifier for the base address and for the user identifier:

For example, identifier manager 130 is arranged to determine if the base address is registered with the identifier manager, and if not: assign a unique base address system-identifier 315 to the base address, and store the base address together with the base address system-identifier, if so: obtain the base address system-identifier 315, For example, identifier manager 130 is arranged to determine if the received user identifier is registered with the identifier manager, and if not: assign a unique user system-identifier 325 to the user identifier, and store the user identifier together with the user system-identifier, if so: obtain the user system-identifier 325.

Password generation device 100 includes a password unit 140. Password unit 140 is arranged to compute the password. Password unit 140 is arranged to determine a first combined identifier 340 from the base address system-identifier, the user system-identifier, and the received user password. For example, password unit 140 may be arranged with a first combined identifier function, which password unit 140 applies to the base address system-identifier, the user system-identifier, and the user password. The function may be both collision resistant and one-way. For example, the function may include a cryptographic hash function. A final password may be computed directly from the first combined identifier 340, e.g., by a password constraint unit 148 (further explained below). First combined identifier 340 may also be used as a password directly. Note that generally numbers may be expressed as a bit string, character strings etc., as desired. Password constraint may include limits on the number of characters, the number of letters, the number of digits, the number of punctuation marks, etc.

Because the password is made up of several elements, the individual elements need not be as strong. For example, one may generate a secure password while the user needs just to remember a relatively easy password. Moreover, he may even reuse this password for all or most computer resources, e.g., for all or most his accounts. Guessing a password is hard for an attacker as he does not have access to the system-identifiers.

Deriving a final password from the first combined identifier 340, e.g., as disclosed above or via a second combined identifier, as shown below, has a number of advantages. All or most passwords for a particular computer resource, e.g., for a particular website, e.g., for nytimes.com may be reset together by changing the base address system-identifier. Likewise, all or most password of a particular user may be reset together by changing the user system-identifier. In an embodiment, the identifier manager is arranged to change the base address system-identifier, thus renewing all or most passwords for the computer resource, and/or change the user system-identifier, thus renewing all or most passwords for the user identifier. For example, password generation device 100 may include an identifier manager interface for effecting said changes. The identifier manager interface may be protected. For example, the identifier manager interface may password protected, just accessible locally (not over a computer network), etc.

For example, once a site has been compromised, all or most passwords for that site may be invalidated at once. As first combined identifier 340 is computed using a collision resistant function, password generation device 100 is not likely to generate an invalidated password again.

Note that to change all or most password for a particular resource and/or for a particular user none or few of the received components, (e.g. user identifier, computer address and user password) needs to be changed. This allows one to invalidate passwords without user impact.

In an embodiment, identifier manager 130 is also used for the first combined identifier 340 to obtain a first combined system-identifier 345. For example, identifier manager 130 may be arranged to determine if first combined identifier 340 is registered with the identifier manager, and if not: assign a unique first combined system-identifier 345 to first combined identifier 340, and store first combined identifier 340 together with the first combined system-identifier 345, if so: obtain the first combined system-identifier 345 assigned to first combined identifier 340.

Password unit 140 is further arranged to determine a second combined identifier 350 from at least first combined system-identifier 345. Password unit 140 may use additional inputs to determine second combined identifier 350. In an embodiment, password unit 140 uses one or more of the user identifier, the base address, and the user password as an additional input. For example, password unit 140 may be arranged with a second combined identifier function, which password unit 140 applies to its inputs. The second combined identifier function may have the same requirements as the first combined identifier function. For example, the two functions may be the same. For example, the second combined identifier function may include a cryptographic hash function. In an embodiment, the second combined identifier function receives as input at least first combined system-identifier 345 and the user password. In an embodiment, password unit 140 may use as an additional input the first combined identifier 340, possibly in addition to the above inputs such as the user password.

In an embodiment, storing the first combined identifier 340 if none or few is yet registered is done by storing the hash of the first combined identifier 340. This improves security in case the database is compromised. For example, identifier manager 130 may be arranged to determine if first combined identifier 340 is registered with the identifier manager, by hashing first combined identifier 340 and using the hash as a key to find the first combined system-identifier 345 in a storage, e.g., a local storage, a database 132, a cloud storage etc. If the hash of first combined identifier 340 is not found as key, e.g., no corresponding first combined system-identifier 345 has previously been assigned, then a unique first combined system-identifier 345 is assigned to first combined identifier 340. In this case, the first combined system-identifier 345 may be stored in the storage associated with the hash of first combined identifier 340 as key. A key is sometimes also referred to as a database key. Instead of a database, also an associative array may be used to store key, value pairs. For example, pairs (h(x), y) may be stored in which x is the first combined identifier 340, y is the first combined system-identifier 345, and h is a (possibly salted) hash function.

Computing the password in stages which use received user inputs and system-identifiers has the effect that passwords can be cancelled more selectively. In an embodiment, identifier manager 130 is arranged to change first combined system-identifier 345, thus renewing second combined identifier 350 and/or final password for the user identifier and the computer resource. This allows changing just the password for a particular computer resource, without resetting all or most passwords for that user, or for that computer resource.

In an embodiment, password generation device 100 includes a password constraint unit 148. Password constraint unit 148 is arranged to obtain, e.g., retrieve, password constraints for the computer resource. For example, the password constraints may be retrieved from a local storage, e.g., from database 132, or may be retrieved from the computer resource, etc.

Password constraint unit 148 determines a final password from second combined identifier 350 (or from first combined identifier 340 if no second combined identifier is used) that satisfies the password constraints. For example, second combined identifier 350 may be a 512-bit string, e.g., as the output of a hash function. A password constraint may be the length of the password. The password constraint may be that a maximum of 8 alpha-numeric characters are used in the password. This constraint may be retrieved and a password satisfying this condition may be generated. For example, second combined identifier 350 may be mapped to a base 62 number (26+26+10) which in turn is mapped to an alpha-numeric string. The string may then be truncated to 8 characters. Many constraints may be adopted in this way. It is noted that instead of a constraint unit, the computer resource may be adapted to accept a bit string directly as a password, say, a 512-bit string. A further constraint may be that the final password contains at least one digit. This may be accomplished by first selecting a digit and position, based on the second combined identifier 350, followed by filling the remaining positions based on the second combined identifier 350. The same may be used for prescribed letters, punctuations, etc.

Satisfying the further constraint that the final password contains at least one digit may also be accomplished by first selecting a character from the second combined identifier 350 based on the frequency that that character occurs in the identifier and then replacing it by a digit. The selected character determines which digit is chosen, e.g., by using a modulus function. This procedure may be used to meet all or most prescribed letters, punctuations, etc., and may be repeated in case more than one digit etc. may be required.

In the embodiment, shown in FIG. 1a, identifier manager 130 uses a database 132. For example, identifier manager 130 may store in database 132, records containing a data item, and a system identifier, and possibly other information such as a data type. Data types may include, e.g., base address and user identifier, etc. In an embodiment, database 132 uses one more associative arrays, which associate a data item with a system identifier. For example, database 132 may include an associative array for base addresses, for user identifiers, etc.

Figure 1B:
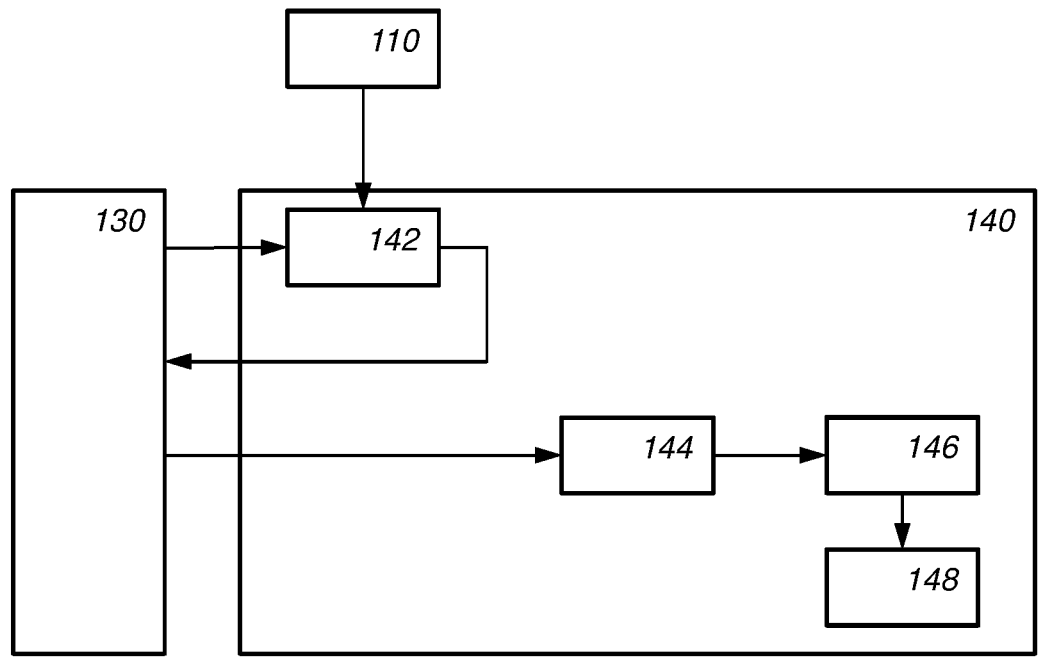

FIG. 1b schematically shows an example of an embodiment of password unit 140.

Password unit 140 includes a first combined identifier unit 142 arranged to receive input from input unit 110, e.g., the user password 330, and from identifier manager 130, e.g., the base address system-identifier 315 and the user system-identifier 325. First combined identifier unit 142 may be arranged to apply a first combined identifier function. Password unit 140 further includes a second combined identifier unit 144. Second combined identifier unit 144 is arranged to receive input from identifier manager 130, e.g., first combined system-identifier 345. Second combined identifier unit 144 may receive additional inputs, e.g., first combined identifier 340, or inputs from input unit 110, e.g., the user password, etc. Password unit 140 may further include a password constraint unit 148 for computing a final password that satisfies constraints imposed by the computer resource.

In an embodiment, password generation device 100 may be arranged to store a password correction factor. Password unit 140 may include a password correction unit 146 arranged between second combined identifier unit 144 and password constraint unit 148, and arranged to apply the password correction factor to second combined identifier 350 to map it to a further second combined identifier previously generated for a different user identifier. For example, the password correction factor may be stored in database 132, e.g., together with the second combined system-identifier, etc. From the correction factor it is not possible to determine either combined identifier.

Password correction unit 146 allows two different users to share an account in a safe manner. It is not uncommon for users to share their passwords, for example, to jointly use the same account. If the two users have a different user identifier the system as described above will compute a different password for the two users. For example, if a first user has a first second combined identifier computed for him, while a second user has a second second combined identifier computed for him. By storing, e.g., the difference between the first second combined identifier and second second combined identifier as a correction factor, password correction unit 146 can map, e.g., the second second combined identifier to the first second combined identifier. By removing the correction factor the link between the accounts is removed. The difference may be computed in a number of ways, e.g., as an arithmetical difference, an XOR, etc.

Password correction unit 146 may also be used to enforce that a password remains the same even if, say, the base address of a computer resource, the user identifier or user password changes.

Figure 2:
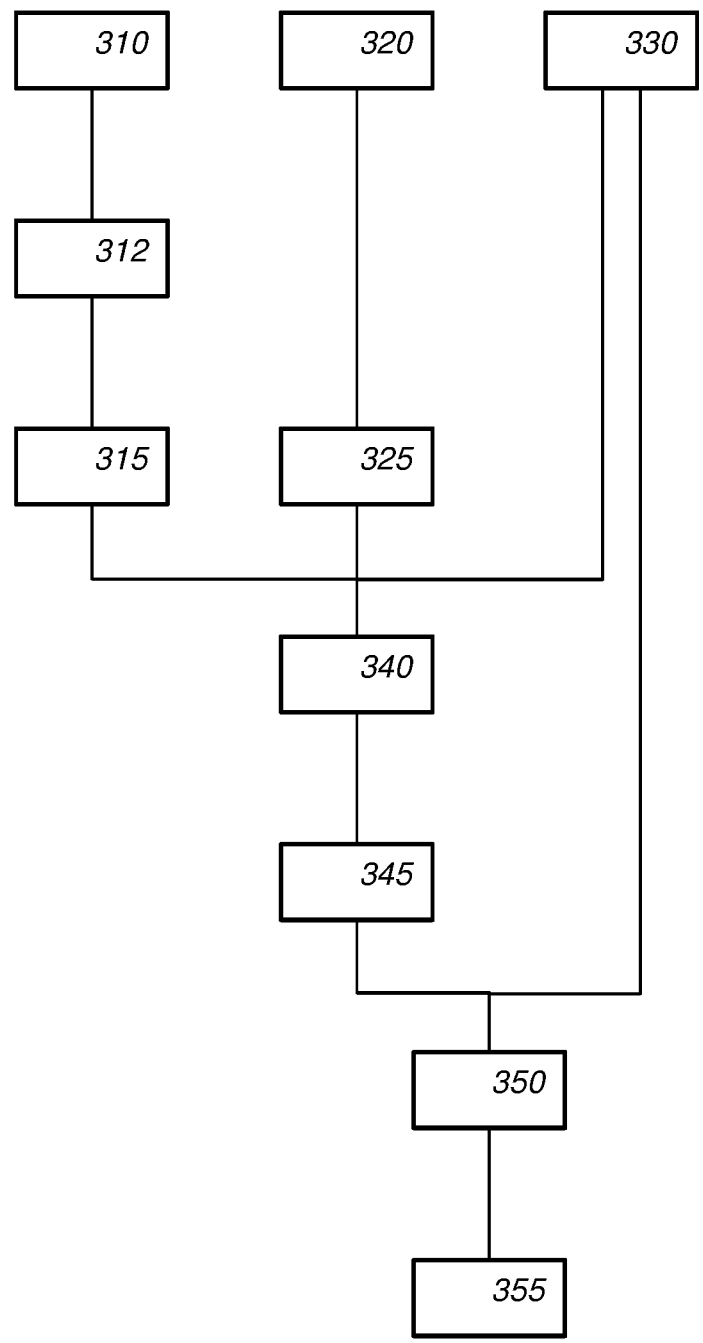

FIG. 2 schematically shows an example of a derivation of a final password. Shown in FIG. 2 are a computer address 310, a user identifier 320, and a user password 330. These may, e.g., be received from user device 200.

Computer address 310 is mapped to a base address 312, which in turn is mapped to a unique base address system-identifier 315. User identifier 320 is mapped onto a unique user system-identifier 325. The three data items: base address system-identifier 315, user system-identifier 325, and user password 330 are mapped onto a first combined identifier 340. First combined identifier 340 is mapped to a first combined system-identifier 345. Note that by changing any of the mappings of the system-identifiers the corresponding password(s) can be invalidated.

First combined system-identifier 345 is mapped to second combined identifier 350 possibly together with another input. For example, FIG. 2 shows that also user password 330 is used in this mapping. Finally, second combined identifier 350 is mapped to a final password 355 that satisfies password constraints.

Figure 3:
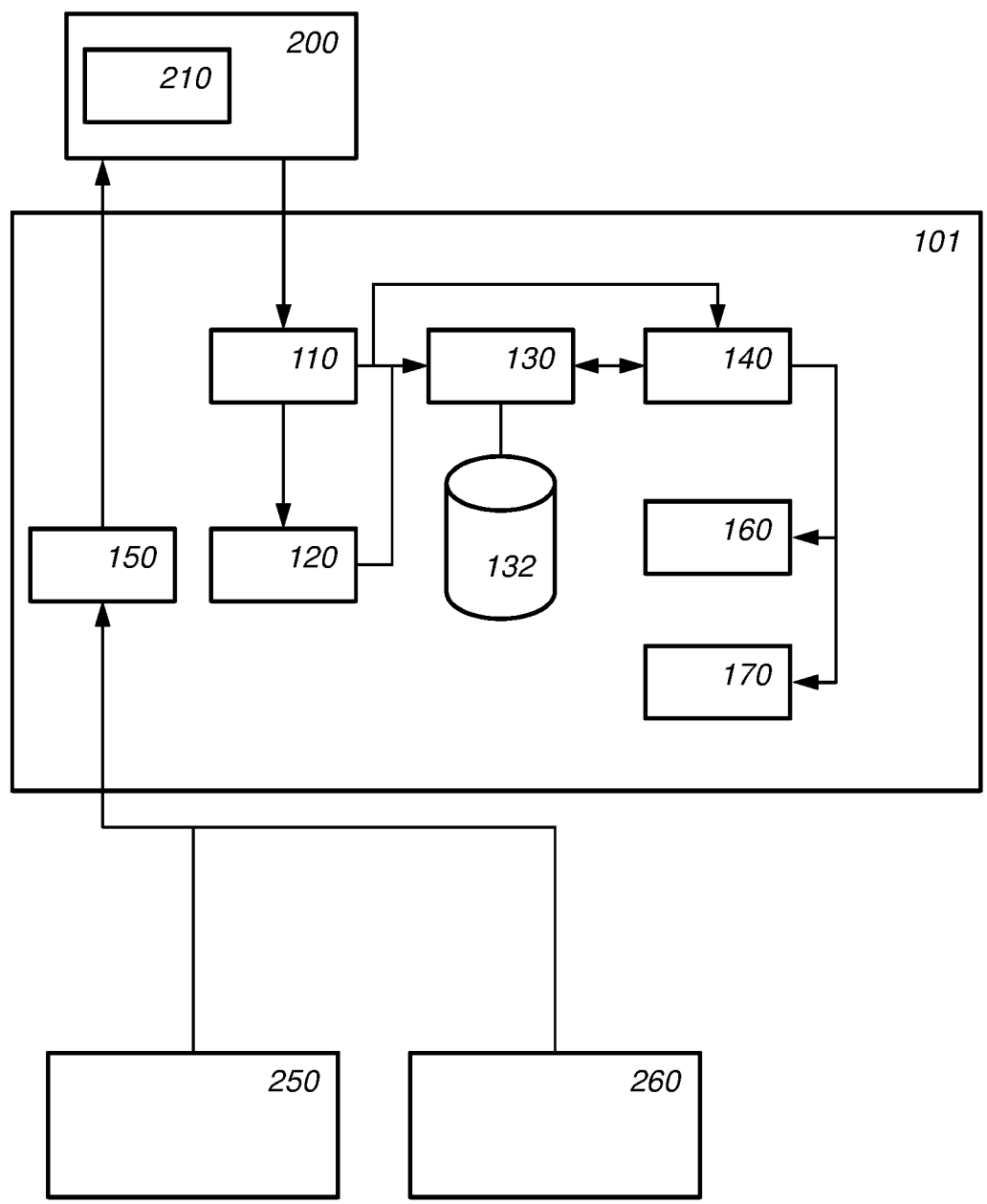

FIG. 3 schematically shows an example of an embodiment of a password generation device 101. Password generation device 101 is a refinement of password generation device 100 and includes a number of additional optional features.

Password generation device 101 includes a login provider unit 150 arranged to interface between a first login provider 250 and user device 200. First login provider 250 is arranged to provide a first original user identifier. For example, first login provider may be a login provider such as Google, Facebook, LinkedIn, etc., e.g., using the OpenID Connect protocol. Login provider unit 150 is arranged to obtain the user identifier from the first original user identifier and sent it to the user device. For example, login provider unit 150 may apply a user identifier function to the original user identifier. The user identifier function may include a hash function, e.g., a cryptographic hash.

Using the OpenID Connect protocol may work as follows. First the user attempts to log in at login provider unit 150. If no previous login is still valid, login provider unit 150 redirects the login attempt to first login provider 250. At login provider 250, e.g., Google, the user log's in using his regular login credentials. Next he is redirected back to login provider unit 150. At login provider unit 150 an original user identifier, as provided by login provider 250 is received. The user identifier is obtained from the original user identifier. For example, this mapping may be a function, e.g., using a hash, but it may also use identifier manager 130. The user identifier is then sent on to user device 200. Consequently, user device 200 uses the user identifier to get passwords from password generation device 101.

Note, if no previous login is still valid, login provider unit 150 may also redirect the user to a menu in which he can choose a login provider. After selection of the user, login provider unit 150 redirects the user to the selected login provider.

Using the OpenID Connect standard a user identifier is obtained without the need for password generation device 101 to store user accounts and credentials. In fact, a user does not need to create an account at password generation device 101. The OpenID Connect protocol makes it possible to use the infrastructure of these so-called login providers to authenticate a user. Password generation device 101 is given a unique user identifier of the login provider which is then used in hashed form or in encrypted form, etc., as one of the three components, e.g., user identifier 320, of the generated password. There is thus neither a need for storage of the user password, nor of the original user identifier originating from login provider 250.

This method increases trust of the user, because he/she does not need to entrust password generation device 101 with storing a password or an original user identifier. Moreover, multiple login providers may be used and the user can choose what one he/she wants to use. At present, e.g. Google, Facebook, LinkedIn and Microsoft provide login services usable with password generation device 101. Password generation device 101 can thus piggyback on the security infrastructure of the login provider. For example, two-factor authentication as provided by e.g., Google is thus available for password generation device 101. The multiple login providers may be connected over a suitable login protocol, e.g., the OpenID Connect protocol.

In an embodiment, login provider unit 150 is arranged to work with multiple login providers, e.g., first login provider 250 and second login provider 260. For example, if a user logs-in using second login provider 260, password generation device 101 will be provided with a further original user identifier. If this second original user identifier were hashed to a further user identifier, then all or most passwords of that user would be different. In an embodiment, identifier manager 130 is arranged to store a user identifier correction factor, which password generation device 101 applies to the further user identifier to map it to the user identifier, e.g., in the input unit, the password generation unit, etc. As with the correction factor for passwords, the user identifier correction factor may be a difference between the further user identifier and the user identifier. As with the correction factor for passwords, it is not possible to determine either user identifier from the correction factor.

An effect of the user identifier correction factor is that a user does not need to keep track which login provider he used for which sites. Moreover, a user can use a login provider of choice, even if the computer resource does not support a particular login provider. It is sufficient that password generation device 101 supports a particular login provider. In this way many login providers can be supported by websites through password generation device 101, even while they themselves may only support simple password logins. For example, website A may support login provider 250 in addition to manual login with a password, and website B may support login provider 260 in addition to manual login with a password. However, login provider 150 may support both login provider 250 and login provider 260. This means that a user can login to login-provider 250 or 260 as desired, receive a (original) user identifier, and receive a password for either website A or website B. Moreover, by using a correction factor, the user will get the same password regardless of the login using login provider 250 or 260. This means that a user can use login provider 260 even if he uses website A, or login provider 250 even if he uses website B. In both cases the manual login option of websites A and B is used to enter the password generated by the password generation device. Password generation device 101 thus acts as a broker between the computer resource, e.g., website, and the user. A user need only give permission to password generation device 101 to log in via the login provider.

In an embodiment, identifier manager 130 is arranged to store a hash of a generated password, optionally salted with a random salt. This hash is referred herein as the signature of the generated password. The signature serves as a key to store additional information about the generated password. This may include the corresponding computer address or the base address, the applied password restrictions, etc. Consequently, having the generated password or a hash thereof allows finding the associated information and, for example, allows verifying if the corresponding computer address or base address is correct.

For example, in an embodiment, password generation device 101 may include a verification unit 160. Verification unit 160 includes an interface arranged to receive a password and optionally a computer address. Verification unit 160 is arranged to determine if the password was stored in hashed form and optionally if the received address matches the base address associated with the stored hashed password. Verification unit 160 may receive passwords on the interface in hashed or unhashed form. Thus, a computer resource can query verification unit 160 through the interface to verify if a particular password was generated for that particular resource. For example, verification unit 160 may operate as follows. If the password has been received on the interface in unhashed form the password is hashed to obtain the signature; if the password has been received in hashed form, then the received password in hashed form may directly form the signature. Next the verification unit 160 verifies if the password was previously stored by identifier manager 130 by looking up the hashed received password, e.g., by looking up the signature. If a signature is found the associated additional information is retrieved including the computer address or the base address. If a signature was not found, the received password was not generated by the password generator. Next, the retrieved computer address is compared with the received computer address. If both addresses are equal the received generated password was generated for the received computer address, otherwise the received generated password is used at an incorrect website, which may point to an attack, or to an error in the system, etc.

In an embodiment, the interface of verification unit 160 is arranged to receive a password in unhashed form, e.g., from a computer resource using verification unit 160 to verify a password. In this embodiment, identifier manager 130 may store tuples $(h(p_i), a_j, \ldots, a_k)$. In these formulas $p_i$ denotes a generated password, h denotes a hash function (possibly including a salt), $a_j, \ldots, a_k$ denote attributes associated with the generated password. The attributes may include the computer address or base address. In these formula's, the first entry is the signature which serves as key. After verification unit 160 receives a password p, and computer address ca, it can computer a signature h(p) retrieve the associated stored attributes and compare the received computer address with the retrieved computer address to verify if they are equal.

In an embodiment, the interface of verification unit 160 is arranged to receive password in hashed form, e.g., from a computer resource willing to verify a password. In this embodiment, identifier manager 130 may store tuples $(h(p_i), a_j, \ldots, a_k)$. After verification unit 160 receives a hashed password h(p), and computer address ca, it can use the signature h(p) as a key and both retrieve the associated stored attributes and compare the received computer address with the retrieved computer address to verify if they are equal. In the above embodiments, the attributes may store a base address, and a received computer address is mapped to the base address before comparison.

The first option is useable if the password is received on the interface of verification unit 160 in plain form, the latter option is useable if the password is received on the interface of verification unit 160 in hashed form $(h(p_i))$.

Verification unit 160 can determine if an attacker is using a captured password at an incorrect website to see if the password works. If such a determination is made, the password may be disabled, e.g., by changing the first combined system-identifier, or even the user system-identifier and/or base address system identifier associated with the stored hashed password; e.g., depending on a level of escalation. The hashed password may be stored by identifier manager 130, e.g., together with the first combination system-identifier. Hashed passwords may be stored even if the corresponding system-identifiers changed, so that abuse of old passwords may also be detected. The embodiments given herein are exemplifying, but it is emphasized that different usage patterns can be identified in this manner and action can be taken in different ways as appropriate.

Password generation device 101 does not store passwords itself. But verification unit 160 may store a signature of the password. The signature may be a hash over the password generated by the password generation device 101 optionally in combination with a salt. A signature may be associated with additional information. The additional information may include the web site for which the password was generated. The signature of the generated password may be used as a key used to retrieve the additional information. As the hash is one-way, it is not possible to obtain the produced password itself, or the user password, or the user ID of the login provider, from the signature.

A computer resource, e.g., a website, can send a password in hashed form to password generation device 101 and verification unit 160 can validate:

1. Whether the signature of the received password corresponds to a password that is generated by password generation device 101. If so, it is known to the website it received a strong globally unique password from the user. If not, the website may reject the password, e.g., because no quality guarantee for the password can be given. For example, the website may alert the user and/or provide information that he/she ought to use password generation device 101.
2. Whether the signature of the received password corresponds to a password that is generated for that particular website. If not, then we have to deal with abuse or user error.
3. Whether the signature of the received password corresponds to a password that is active, e.g., that it is not blocked. If so, the password is strong, and intended for the site and active. If not, then this is probably abuse, or may correspond to user who stored his old password somewhere and use it now. Such a user can be informed directly by verification unit 160.

In an embodiment, password generation device may be used anonymously and there may be no way to contact a user. However, verification unit 160 may be arranged to inform the owner of the password of abuse or user error, e.g., by e-mail. For example, a user may have the option to register his/her contact information during initial registration, e.g., an email address. A signature maybe associated with a registered user so that verification unit 160 may obtain the contact information of a user via a signature.

Accordingly, verification unit 160 provides a password validation capability with the option to provide direct feedback to the user. The use of incorrect or inactive passwords can be monitored by verification unit 160. Both the website for which a password was generated and the website who reported the password on verification unit 160's interface may be informed by verification unit 160 of the incorrect password attempt.

Thus, password generation device 101 can validate the strength of a password beyond the boundaries of websites. This makes password constraints as enforced by some websites redundant. The websites can be assured that if the password is generated by password generation device 101, then the password is strong and globally unique. It is noted that current password constraints cannot verify if a password is globally unique. In fact, a website using password generation device 100 or 101, does not need to use a user identifier for logins. Since passwords are strong, and unique, at least for the website, which may be globally unique, the user may be uniquely identified by its password.

In an embodiment, password generation device 101 includes a ticket unit 170. Ticket unit 170 is arranged to assign a ticket identifier to a generated password, and to store: the ticket identifier, a ticket constraint, and the generated password. Ticket unit 170 is arranged to send the ticket identifier to user device 200.

Ticket unit 170 is arranged to receive a received ticket identifier and a received computer address from the computer resource, and verify that ticket identifier was assigned by the ticket unit 170 and that the received computer address matches the base address associated with the generated password, and the ticket constraint, and if so send the generated password to the computer resource.

Using a ticket, it is avoided that the final password needs to pass through the user device. The user device and the connection between the user device and the resource are probably the main source of malware, and thus the most likely point where passwords become compromised. In this way the security of the password is increased.

In this authentication method, password generation device 101 generates a final password as usual, but does not send the password to user device 200. The ticket identifier may be random number. The ticket is (at least temporarily) stored. When the computer resource sends the ticket identifier, password generation device 101 verifies various constraints, e.g., if the ticket has not yet been used, if the ticket has been generated for that site, if the ticket has been received in a time frame associated with the ticket, etc. Tickets and/or its passwords may be communicated encrypted, e.g., using https.

In an embodiment, the ticket as well as the stored generated password has an expiry date. After the expiry date the password is deleted from the system. This means that tickets cannot be used after the expiry date. It also means that the exposure of the password is limited. In an embodiment, the password is stored in encrypted form, e.g., using a key stored in the system, e.g., in a volatile memory.

In an embodiment ticket unit is further extended to manage personal information about the user. For example, the password generation device may store one or more personal information items associated with the user. Ticket unit 170 is arranged to generate a further ticket identifier, and to associate the further ticket identifier with the user. In a sense two tickets are created, e.g., together with generating the password. The first ticket is used to transmit the password to the correct computer resource, e.g., web site, without going through the user device; the second ticket is used to manage the personal information. Initially, just the first ticket is transmitted to the computer resource, e.g., through the user device.

When the first ticket is used, e.g., correctly verified as indicated above, the generated password is sent (possibly after local decryption and/or encryption for transmission) to the computer resource. The second ticket, e.g., the further ticket identifier, is also sent to the computer resource, e.g., together with the generated password.

Later, if the computer resource needs access to a personal information item, the computer resource can send the second ticket, e.g., the further ticket identifier, to system 100. Ticket unit 170 is arranged to receive the further received ticket identifier, and to verify that the further received ticket identifier matches the stored further ticket identifier. If the latter verification is correct, the personal information associated with the user is sent to the computer resource.

The second ticket can be used to request additional information about a user. For example, an email address or a phone number, etc. In this way, a user can manage the sites which may retrieve information about him. The user can keep track of this information on a location, e.g., device 100. Should a user stop using a computer resource, he can deny further access to his information at device 100.

Typically, the devices 100, 101, 200, 250 and 260 each include a microprocessor (not separately shown) which executes appropriate software stored at the device; for example, that software may have been downloaded and/or stored in a corresponding memory, e.g., a volatile memory such as RAM or a non-volatile memory such as Flash (not separately shown) of the device. Alternatively, the devices may, in whole or in part, be implemented in programmable logic, e.g., as field-programmable gate array (FPGA). The devices may be implemented, in whole or in part, as a so-called application-specific integrated circuit (ASIC), i.e., an integrated circuit (IC) customized for their particular use. For example, the circuits may be implemented in CMOS, e.g., using a hardware description language such as Verilog, VHDL etc.

In an embodiment, password generation device 101 includes an input circuit, a computer address circuit, an identifier manager circuit, a password circuit, a login provider circuit, a verification circuit, a ticket circuit, etc. The circuits implement the corresponding units described herein. The circuits may be a processor circuit and storage circuit, the processor circuit executing instructions represented electronically in the storage circuits. The circuits may also be, FPGA, ASIC or the like.

Figure 4:
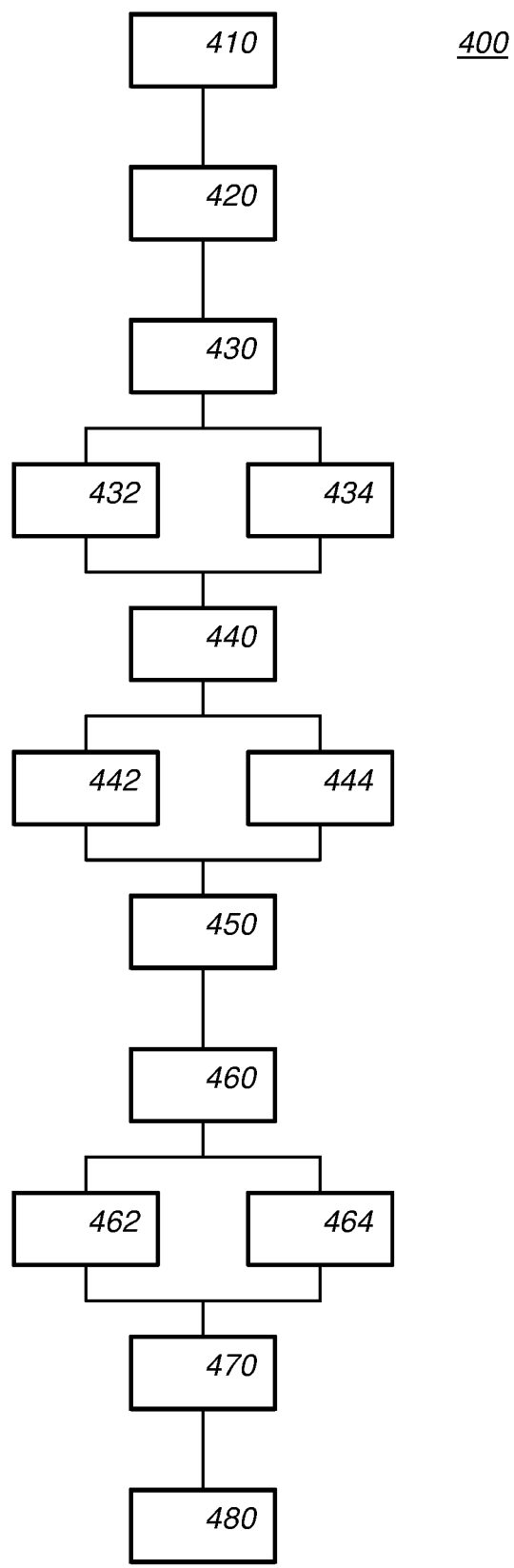

FIG. 4 schematically shows an example of an embodiment of a password generation method 400 in the form of a flow chart.

A password generation method 400 includes receiving 410 from a user device, a computer address 310, URL1 for accessing a computer resource, a user identifier 320 indicating a user of the user device, and a user password 330, mapping 420 the computer address to a base address 312, so that multiple computer addresses URL1, URL2 are mapped to the same base address, determining 430 if the base address is registered with the identifier manager, and if not: assigning 432 a unique base address system-identifier 315 to the base address, and store the base address together with the base address system-identifier, if so: obtaining 434 the base address system-identifier, determining 440 if the user identifier is registered with the identifier manager, and if not: assigning 442 a unique user system-identifier 325 to the user identifier, and store the user identifier together with the user system-identifier, if so: obtaining 444 the user system-identifier, and determining 450 a first combined identifier 340 from the base address system-identifier, the user system-identifier, and the user password, determining 460 if first combined identifier 340 is registered with the identifier manager, and if not: assigning 462 a unique first combined system-identifier to first combined identifier 340, and store first combined identifier 340 together with the first combined system-identifier, if so: obtaining 464 the first combined system-identifier assigned to first combined identifier 340, and determining 470 a second combined identifier from at least the first combined system-identifier, and determining 480 a final password from second combined identifier 350 satisfying the password constraints of the resource.

Note that method 400 includes optional steps 460-480. Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 430-434 and 440-444 may be reverted or executed, at least partially, in parallel. Moreover, a given step may not have finished completely before a next step is started.

A method according to the presently disclosed subject matter may be executed using software, which includes instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the presently disclosed subject matter may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of the method according to the presently disclosed subject matter. An embodiment relating to a computer program product includes computer executable instructions corresponding to each of the processing steps of at least one of the methods set forth. These instructions may be subdivided into subroutines and/or be stored in one or more files that may be linked statically or dynamically. Another embodiment relating to a computer program product includes computer executable instructions corresponding to each of the elements of at least one of the systems and/or products set forth.

Figure 5A:
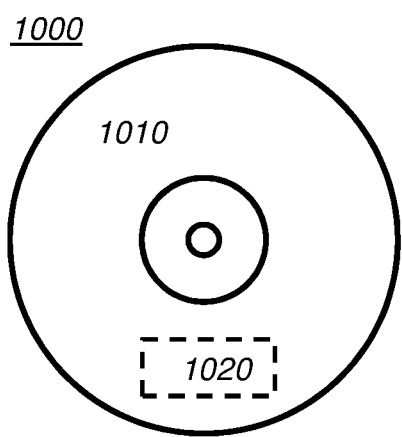

FIG. 5a shows a computer readable medium 1000 having a writable part 1010 including a computer program 1020, the computer program 1020 including instructions for causing a processor system to perform a method of password generation, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 includes instructions for causing a processor system to perform said method of password generation.

Figure 5B:
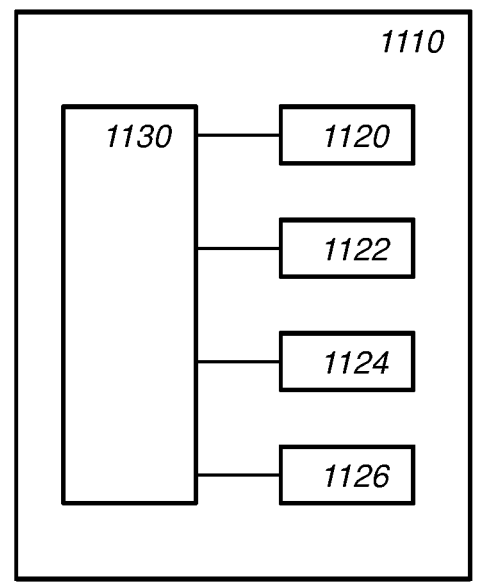

FIG. 5b shows in a schematic representation of a processor system 1140 according to an embodiment. The processor system includes one or more integrated circuits 1110. The architecture of the one or more integrated circuits 1110 is schematically shown in FIG. 5b. Circuit 1110 includes a processing unit 1120, e.g., a CPU, for running computer program components to execute a method according to an embodiment and/or implement its modules or units. Circuit 1110 includes a memory 1122 for storing programming code, data, etc. Part of memory 1122 may be read-only. Circuit 1110 may include a communication element 1126, e.g., an antenna, connectors or both, and the like. Circuit 1110 may include a dedicated integrated circuit 1124 for performing part or all or most of the processing defined in the method of password generation. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb "include" and "comprise" and its conjugations does not exclude the presence of elements or steps other than those stated in a claim. The article "a" or "an" preceding an element does not exclude the presence of a plurality of such elements. The presently disclosed subject matter may be implemented by hardware including several distinct elements, and by a suitably programmed computer. In the device claim enumerating several elements, several of these elements may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

LIST OF REFERENCE NUMERALS

- 100,101 a password generation device
- 110 an input unit
- 120 a computer address unit
- 130 an identifier manager
- 132 a database
- 140 a password unit
- 142 a first combined identifier unit
- 144 a second combined identifier unit
- 146 a password correction unit
- 148 a password constraint unit
- 150 a login provider unit
- 160 a verification unit
- 170 a ticket unit
- 200 a user device
- 210 a web browser
- 250 a first login provider
- 260 a second login provider
- 310 a computer address
- 312 a base address
- 315 a base address system-identifier
- 320 a user identifier
- 325 a unique user system-identifier
- 330 a user password,
- 340 a first combined identifier
- 345 a first combined system-identifier
- 350 a second combined identifier
- 355 a final password

The invention claimed is:

1. A password generation device comprising:
   an input interface arranged to receive, from a user device,
      a computer address for accessing a computer resource,
      a user identifier indicating a user of the user device, and
      a user password; and
   a memory and a processor configured to execute software stored in the memory, the software comprising parts for:
   a computer address unit arranged to map the computer address to a base address, so that multiple computer addresses are mapped to the same base address;
   an identifier manager arranged to
      determine if the base address is registered with the identifier manager, and
         if not, assign a unique base address system-identifier to the base address, and store the base address together with the base address system-identifier, and
         if so, obtain the base address system-identifier;
      determine if the user identifier is registered with the identifier manager, and
         if not, generate by the identifier manager a unique user system-identifier and assign the unique user system-identifier to the user identifier, and store the user identifier together with the user system-identifier, and
         if so, obtain the user system-identifier; and
   a password unit arranged to
      determine a first combined identifier by applying a first combined identifier function taking as input the base address system-identifier, the user system-identifier, and the user password, and
      determine a final password from the first combined identifier, the identifier manager being further arranged to
      change the base address system-identifier, thus renewing all passwords for the computer resource, and/or
      change the user system-identifier, thus renewing all passwords for the user identifier.

2. A password generation device as in claim 1, wherein the identifier manager is further arranged to
   determine if the first combined identifier is registered with the identifier manager, and
      if not: assign a unique first combined system-identifier to the first combined identifier, and store the first combined identifier together with the first combined system-identifier,
      if so: obtain the first combined system-identifier assigned to the first combined identifier, and
   the password unit is further arranged to determine a second combined identifier from at least the first combined system-identifier, and to determine the final password from the second combined identifier and/or the first combined identifier.

3. The password generation device according to claim 2, wherein the identifier manager is arranged to change the first combined system-identifier, thus renewing the second combined identifier and/or final password for the user identifier and the computer resource.

4. The password generation device according to claim 1, wherein
   the password unit is further arranged to retrieve password constraints for the computer resource and to determine a final password satisfying the retrieved password constraints.

5. The password generation device according to claim 1, wherein the software further comprises a part for a login provider unit arranged to interface between a first login provider and the user device, the first login provider providing a first original user identifier, the login provider unit being arranged to obtain the user identifier from the first original user identifier and sent it to the user device.

6. The password generation device according to claim 1, wherein the login provider unit is arranged to interface between a second login provider and the user device, the second login provider providing a second original user identifier, the login provider unit being arranged to obtain a further user identifier from the second original user identifier and sent it to the user device, the identifier manager being arranged to store a user identifier correction factor, the password generation device applying the user identifier correction factor to the further user identifier to map it to the user identifier.

7. The password generation device according to claim 2, wherein the identifier manager stores a password correction factor, the password generation device applying the password correction factor to the second combined identifier to map it to a further second combined identifier previously generated for a different user identifier.

8. The password generation device according to claim 1, wherein the identifier manager is arranged to store a hash of a generated password, optionally together with the computer address or base address, the software further comprises a part for:
a verification unit,
the verification unit including an interface arranged to receive a password and optionally a computer address,
the verification unit being arranged to determine if the password was stored in hashed form and optionally if the received address matches the base address associated with the stored hashed password.

9. The password generation device according to claim 8, wherein the verification unit is further arranged to
store the password in hashed form and optionally the computer address, and
determine if the same password is received multiple times.

10. The password generation device according to claim 1, wherein the software further comprises a part for:
a ticket unit arranged to assign a ticket identifier to a generated password, and to store the ticket identifier, a ticket constraint, and the generated password, the ticket unit being arranged to send the ticket identifier to the user device,
the ticket unit being arranged to
receive a received ticket identifier and a received computer address from the computer resource, and
verify that ticket identifier was assigned by the ticket unit and that the received computer address matches the base address associated with the generated password, and the ticket constraint, and if so, send the generated password to the computer resource.

11. The password generation device according to claim 10, wherein the password generation device stores a personal information associated with the user,
the ticket unit is arranged to generate a further ticket identifier, and to associate the further ticket identifier with the user, and is arranged to send the further ticket identifier to the computer resource after successful verification,
the ticket unit being arranged to
receive a further received ticket identifier, verify that the further received ticket identifier matches the stored further ticket identifier, and if so, send the personal information associated with the user to the computer resource.

12. The password generation device according to claim 1, storing a list of registered device identifiers, the input interface is further arranged to receive a user device identifier, the software being arranged to refuse to generate a password if the user device identifier is not registered or blocked.

13. The password generation device according to claim 1, wherein the user password comprises attributes associated with the user or user device as a biometric identifier obtained from a biometric sensor.

14. The password generation device of claim 1, comprising an identifier manager interface for effecting the change of the base address system-identifier and/or for effecting the change of the user system-identifier.

15. The password generation device of claim 1, wherein the identifier manager is arranged to change the base address system-identifier without changing the user system-identifier and/or to change the user system-identifier without changing the base address system-identifier.

16. The password generation device of claim 1, wherein the identifier manager is arranged to store a hash of the final password.

17. The password generation device of claim 16, wherein the identifier manager is arranged to continue storing the hash when base address system-identifier and/or user system-identifier is changed.

18. A password generation system comprising the password generation device according to claim 1 and the user device, the user device including a web browser arranged to
receive an original user password,
hash the original password, to obtain the user password,
detect a password field in a web page, and
send the user identifier, computer address of the web page, and the user password to the password generation device.

19. A password generation method comprising
receiving from a user device
a computer address for accessing a computer resource,
a user identifier indicating a user of the user device, and
a user password;
mapping the computer address to a base address, so that multiple computer addresses are mapped to the same base address;
determining if the base address is registered with an identifier manager, and
if not, assigning a unique base address system-identifier to the base address, and store the base address together with the base address system-identifier,
if so, obtaining the base address system-identifier;
determining if the user identifier is registered with the identifier manager, and
if not, generating a unique user system-identifier and assigning the unique user system-identifier to the user identifier, and store the user identifier together with the user system-identifier, and
if so, obtaining the user system-identifier; and
determining a first combined identifier by applying a first combined identifier function, taking as input the base address system-identifier, the user system-identifier, and the user password, and
determine a final password from the first combined identifier
change the base address system-identifier, thus renewing all passwords for the computer resource and/or change the user system-identifier, thus renewing all passwords for the user identifier.

20. A computer program comprising computer program instructions arranged to perform the method according to claim 19 when the computer program is run on a computer.

\* \* \* \* \*